United States Patent Office 3,403,193
Patented Sept. 24, 1968

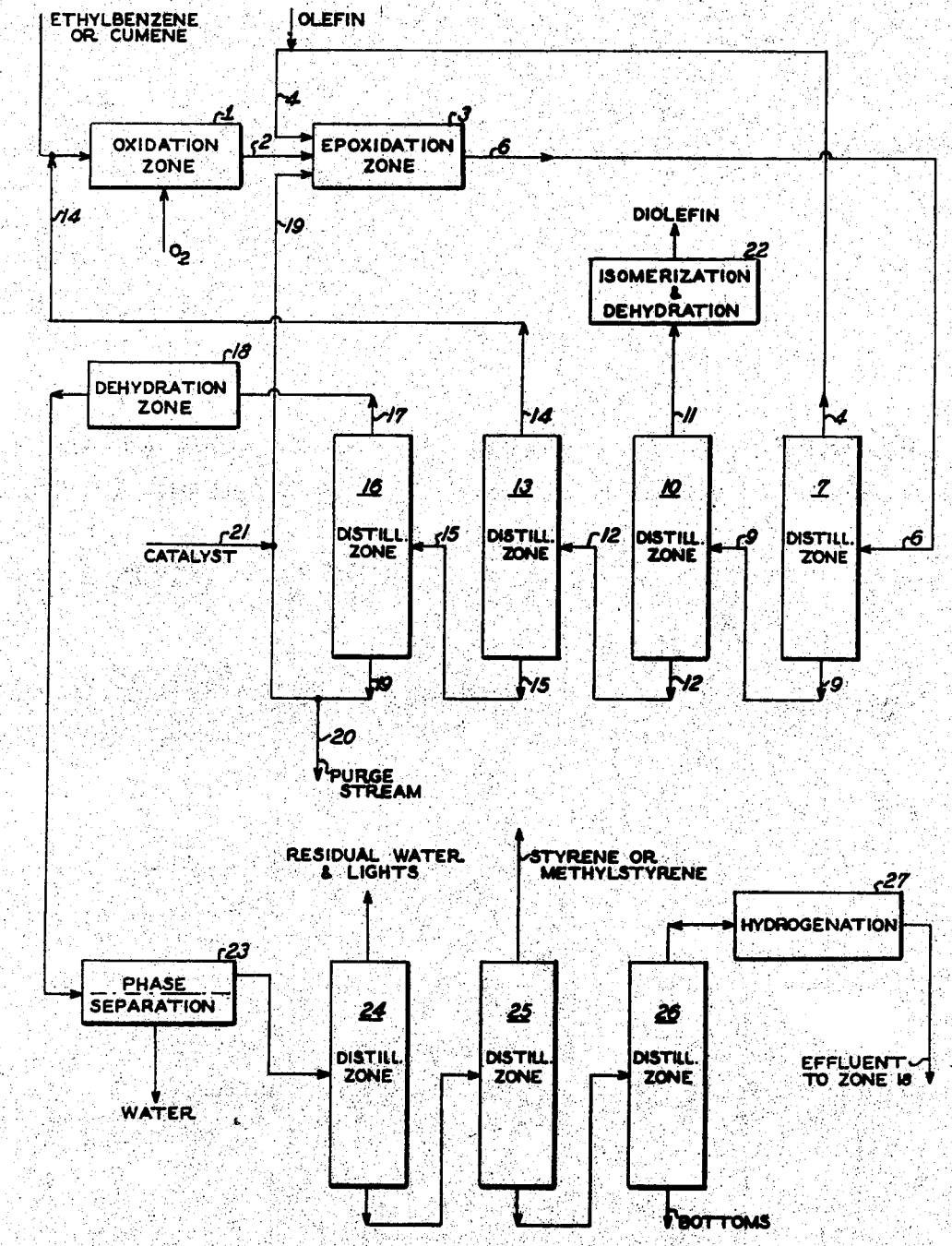

3,403,193
PROCESS FOR THE CO-PRODUCTION OF A
STYRENE AND A DI-OLEFIN
Joseph Lee Russell, Ridgewood, N.J., assignor to Halcon
International, Inc., a corporation of Delaware
Filed June 28, 1965, Ser. No. 467,459
5 Claims. (Cl. 260—669)

ABSTRACT OF THE DISCLOSURE

This application relates to a new and improved process for the co-production of a styrene and di-olefin such as butadiene or isoprene. This is accomplished by first oxidizing ethylbenzene or cumene to the corresponding hydroperoxide, oxidizing an olefin with the hydroperoxide and converting the products of this oxidation to the desired unsaturated materials.

---

The commercial importance of styrenes and diolefins such as butadiene and isoprene is well established. Various techniques have been employed for the production of one or the other of these materials. However, there has existed considerable room for improvements in the economies of producing these materials.

It is an object of this invention to provide a method for the co-production of a styrene and a diolefin.

It is a particular object of the invention to provide a method for the co-production of a styrene and a diolefin using inexpensive and readily available raw materials.

It is a special object to provide a process for the co-production of styrene or alpha methyl styrene and butadiene.

It is also a special object to provide a method for the co-production of styrene or alpha methyl styrene and isoprene.

Other objects will be apparent in the following description of the invention.

The attached drawing illustrates a particular practice of the invention.

Among the many raw materials which are inexpensive and readily available are various olefins and also ethylbenzene and cumene. In accordance with the invention, these materials are converted to the diolefin and the styrene with the additional consumption essentially only of air.

In accordance with the invention, ethylbenzene or cumene is oxidized in the liquid phase with molecular oxygen to produce alpha phenylethyl hydroperoxide (ethylbenzene hydroperoxide) or cumene hydroperoxide. The hydroperoxide is then used to epoxidize an olefin such as a butene or methyl butene whereby the butene is converted to the corresponding oxirane compound and the hydroperoxide is converted to alpha phenyl ethanol or dimethylbenzyl alcohol. The epoxidation mixture is then separated into components and the alcohol is dehydrated to styrene or alpha methyl styrene as the case may be.

The olefin oxide in turn is converted to the diolefin by procedures such as a conjoint isomerization to the allyl alcohol form and dehydration of this to the diolefin.

The advantages of the process will be apparent from the above description. Thus, avaliable and inexpensive materials can conveniently be converted in a simple sequence of operating steps to exceedingly valuable end products. Of particular significance is the fact that the improved process provides for the co-production materials which, although separately are of value, are frequently employed together in the production of synthetic rubber or ABS resins.

In the present invention the phenyl ethyl hydroperoxide or cumene hydroperoxide is prepared through oxidation of ethyl benzene or cumene. The oxidation is carried out using molecular oxygen as provided by air although pure oxygen as well as oxygen in admixture with inert gas in greater or lesser concentrations than air can be used. Oxidation temperatures broadly in the range 40° to 180° C., preferably 90° to 140° C. and pressure of 15 to 1000 p.s.i.a. and preferably 30 to 150 p.s.i.a. can be used. The oxidation is continued until about 1 to 70%, and preferably about 10 to 50% of ethyl benzene or cumene has been converted to the hydroperoxide.

Various additives of known type can be employed during the alkyl-aromatic oxidation to promote hydroperoxide production.

The oxidation effluent mainly comprises a solution of the hydroperoxide in the hydrocarbon with some alcohol formed during the oxidation. This effluent can be employed in the epoxidation without concentrating the hydroperoxide, or the oxidation effluent can be distilled to first concentrate the hydroperoxide.

The phenyl ethyl hydroperoxide or cumene hydroperoxide is then used to epoxidize an olefin having the carbon structure of the desired product diolefin. For example, when butadiene is the desired diolefin either 2-butene or 1-butene or mixtures are employed. Likewise, where isoprene is the desired coproduct, the olefin is 2-methyl-1-butene or 2-methyl-2-butene, or mixtures. 3-methyl-1-butene may also be employed, alone or admixed with the above isomers. It is, however, more difficult to obtain, and thus less attractive economically.

The epoxidation is carried out in the presence of catalysts which may be compounds of the following:

Ti, V, Se, Cr, Zr, Nb, Ta, Te, U, Mo, Ta, W and Re. The preferred catalysts are compounds of Mo, Ti, V, W, Re, Se, Nb, and Te.

The amount of metal in solution used as catalysts in the epoxidation process can be varied widely, although as a rule it is desirable to use at least 0.00001 mol and preferably 0.0002 to 0.03 mol per mol of hydroperoxide present. Amounts greater than about 0.1 mol seem to give no advantage over smaller amounts, although amounts up to 1 mol or more per mol of hydroperoxide can be employed. The catalyst remains dissolved in the reaction mixture throughout the process and can be reused in the reaction after removal of the reaction products therefrom. The molybdenum compounds include the molybdenum organic salts, the oxides such as $MoO_3$, molybdic acid, the molybdenum fluoride, phosphate, sulfide, and the like. Hetero-polyacids containing molybdenum can be used as can salts thereof; examples include phosphomolybdic acid and the sodium and potassium salts thereof. Similar or analogous compounds of the other metals mentioned may be used, as may mixtures thereof.

The catalytic components may be employed in the epoxidation reaction in the form of a compound or mixture which is initially soluble in the reaction medium. While solubility will, to some extent depend on the particular reaction medium employed, a suitably soluble substance contemplated by the invention would include hydrocarbon soluble, organo-metallic compounds having a solubility in methanol at room temperature of at least 0.1 gram per liter. Illustrative soluble forms of the catalytic materials are the naphthenates, stearates, octoates, carbonyls and the like. Various chelates, association compounds and enol salts, such for example, as aceto-acetonates may also be used. Specific and preferred catalytic compounds of this type for use in the invention are the naphthenates and carbonyls of molybdenum, vanadium, titanium, tungsten, rhenium, niobium, tantalum and selenium. Alkoxy compounds such as tetrabutyl titanate and other like alkyl titanate are very useful.

Temperatures which can be employed in the epoxidation can vary quite widely depending upon the reactivity and other characteristics of the particular system. Temperatures broadly in the range of about −20° to 200° C., desirably 0° to 150° C., and preferably 50° to 120° C., can be employed. The reaction is carried out at pressure conditions sufficient to maintain a liquid phase. Although sub-atmospheric pressures can be employed, pressures usually in the range of about atmospheric to about 1000 p.s.i.g. are most desirable.

In the oxidation of the substrate, the ratio of olefin substrate to organic peroxy compounds can vary over a wide range. Generally, mol ratios of olefinic group in the substrates to hydroperoxide broadly in the range of 0.5:1 to 100:1, desirably 1:1 to 20:1 and preferably 2:1 to 10:1 are employed. Additionally, it is advantageous to carry out the reaction to achieve as high a hydroperoxide conversion as possible, preferably at least 50% and desirably at least 90%, consistent with reasonable selectivities.

Basic substances can be employed in the epoxidation. Such basic substances are alkali metal compounds or alkaline earth metal compounds. Particularly preferred are the compounds of sodium, potassium, lithium, calcium, magnesium, rubidium, cesium, strontium, and barium. Compounds which are employed are those which most preferably are soluble in the reaction medium. However, insoluble forms can be employed and are effective when dispersed in the reaction medium. Organic acid compounds such as a metal acetate, naphthenate, stereate, octoate, butyrate, and the like can be employed. Additionally, inorganic salts such as Na carbonate, Mg carbonate, trisodium phosphate, and the like can also be employed. Particularly preferred species of metal salts include sodium naphthenate, potassium, stereate, magnesium carbonate, and the like. Hydroxides and oxides of alkali and alkali earth metal compounds can be used. Examples are NaOH, MgO, CaO, Ca(OH)$_2$, KOH, and the like, alkoxides, e.g., Na ethylate, K-cumylate, Na phenate etc., can be used. Amides such as NaNH$_2$ can be used as can quaternary ammonium salts. In general, any compound of alkali or alkali earth metals giving a basic reaction in water can be used.

The compound is employed during the epoxidation reaction in amount of .05 to 10 mols/mol of epoxidation catalyst desirably, .25 to 3.0 and preferably .50 to 1.50. It has been found that as a result of the incorporation of the basic compound in the reaction system, significantly improved efficiencies in the utilization of the organic hydroperoxides in the epoxidation is achieved.

That is, using the basic compound there results a higher yield of oxirane compound based on hydroperoxide consumed. Also, of the hydroperoxide consumed, a greater amount is reduced to the alcohol instead of other undesirable products through the invention.

Additionally, through use of the basic compound it is possible to employ lower unsaturated compound to hydroperoxide ratios and thus to improve unsaturated compound conversions while retaining satisfactory high reaction selectivities.

The epoxidation reaction mixture is separated by distillation into components. Unreacted olefin and ethylbenzene can be recycled respectively to the epoxidation and oxidation steps.

The alpha phenyl ethanol or alpha alpha dimethyl benzyl alcohol is dehydrated to product styrene or alpha methyl styrene, preferably in a catalytic dehydration although thermal dehydration is possible and feasible.

The dehydration catalyst can be used in supported form or in pellets. Typical supporting materials are crushed sandstone, silica, filter stone, and ceramically bonded, fused aluminum oxide. For instance, the support may be wetted with water, titania powder amounting to about 10 to 15 percent of the support then sprinkled on, and the catalyst and support dried at 150° C. The activity of the titania powder may be increased by treating it with hot aqueous sulfuric acid (e.g., 10 percent), followed by thorough washing with water to remove the acid, before the titania is applied to the support. With titania supported on 4 x 6 mesh, ceramically-bonded, fused aluminum oxide, production ratios of 400 to 650 grams of styrene per liter of catalyst per hour may be obtained. Higher production ratios are possible with the titania catalyst in pellet form, e.g., chemically pure anhydrous grade titanium dioxide powder is wetted with water and the resulting paste dried at 130° to 150° C. The dried cake is powdered and then pelleted. The pellets are then fired in a furnace at a temperature of at least 800° C., and they become very strong, mechanically. Then, they may be subjected to an activation step by immersion in boiling aqueous nitric acid (18–20 percent concentration) for a period of about 90 minutes, thorough washing with water, and drying at about 130° to 150° C. Instead of nitric acid, hydrochloric acid, phosphoric acid or sulfuric acid may be used for the acid treatment. At between 800° and 1000° C., there is a shrinkage of the pellet, and the pellets are harder and denser. These denser, harder pellets do not seem to be as readily activated by nitric acid as those roasted at 800° C., even using the concentrated grade of nitric acid. They may be activated, however, by aqueous phosphoric acid of 20 percent concentration. With the denser, harder pellet dusting of the catalyst, e.g., during a charging operation, is largely eliminated, and for this purpose a roasting temperature of about 1000° C. is preferred.

In general, the smaller pellet size the better the production ratio. Pellet size measuring less than 3/16 inch in the largest dimension are not practical, mechanically. Good production ratios are obtained with pellets measuring up to 3/8 inch in one or more dimensions.

The desirable temperatures of dehydration are between 180° and 280° C. Usually it is necessary to use temperatures below 220° or above 250° C. At below 220° C., steam or reduced pressure may be employed to assist in vaporizing the aralkanol. Temperatures above about 250° to 280° C. may be employed with a high feed rate.

Other dehydration methods and catalysts may be used, and the dehydration can be carried out in liquid phase.

The olefin oxide product from the epoxidation is converted to the corresponding diolefin. In a preferred embodiment the olefin oxide is simultaneously isomerized to the allyl alcohol form and dehydrated to the diolefin. Alternatively the isomerization and dehydration are carried out in separate steps. Other methods are possible.

Catalysts such as alumina, silica, silica-alumina, thoria, chromia, titania, alkali metal and alkaline earth metal sulfates, phosphates, and silicates, alone or admixed either supported or unsupported are useful for converting the olefin oxide to diolefin. Pressure is desirably 10 to 20 p.s.i.a. broadly 2 to 50 p.s.i.a. Temperatures are broadly 150° to 500° C., preferably 250° to 400° C. An inert diluent gas may be employed e.g. steam or nitrogen.

The following examples will serve to illustrate the invention:

Example 1

Referring to the accompanying drawing, ethylbenzene is oxidized with molecular oxygen in oxidization zone 1. The oxidization is carried out at 140° C. and 25 p.s.i.g. The oxidizing gas is air and the oxidation is continued until 14% of the ethylbenzene is reacted.

The oxidization effluent is passed by means of line 2 to epoxidation zone 3. The oxidation effluent contains by weight 82.3% ethylbenzene, 14.0% alpha phenyl ethyl hydroperoxide, 1.5% alpha phenylethanol and 2.2% other products.

In epoxidation zone 3 a mixture of 60% 2-butene (cis and trans) and 40% 1-butene is epoxidized at 110° C. and about 200 p.s.i.a. The mol ratio of the hydroperoxide to olefin epoxidized in zone 3 is 1/6. The olefin is introduced as indicated through line 4.

Epoxidation catalyst comprises molybdenum naphthenate together with sodium naphthenate in a atomic ratio of molybdenum to sodium to 2/1 and is introduced by means of line 19. The amount of molybdenum naphthenate by weight (containing 5% Mo) based on the total mixture is 0.2%.

After a reaction time of 2 hours, hydroperoxide conversion is substantially complete. The epoxidation effluent comprising by weight 61.5% ethylbenzene, 22.1% unreacted butenes, 9.9% alpha phenylethanol, and 4.1% of butene oxides is passed by means of line 6 to distillation zone 7. Unreacted butenes are separated overhead and recycled through lines 8 and 4 back to the epoxidation zone. The overhead distillation temperature is 43° to 55° C. and the pressure is 90 p.s.i.a. The bottoms at 125° C. are passed through line 9 to distillation column 10 and product butene oxides are separated overhead at 52 to 61° C. and 15 p.s.i.a. through line 11.

The bottoms fraction from zone 10 is passed through line 12 to distillation zone 13 and unreacted ethylbenzene separated overhead at 100° C. and 257 mm. Hg. This ethylbenzene is recycled through line 14 back to oxidation zone 1.

The bottoms from column 13 is passed through line 15 to distillation zone 16. Effluent alpha phenylethanol and by-product acetonephenone are removed overhead from column 16 at 100° C. and 1.5 mm. Hg and passed through line 17 to dehydration zone 18. In zone 18 the phenylethanol is dehydrated in the vapor phase at 250° C. and 20 p.s.i.a. by passage over titania catalyst pellets at a liquid hourly space velocity of 0.5 hour$^{-1}$.

The effluent from the dehydration is phase separated in 23 to remove water and the organic phase is distilled in 24 to remove residual water and lights overhead. In the next column 25 styrene is taken overhead at 70° C. and 60 mm. pressure. The bottoms are sent to a flash distillation 26 where unconverted alpha phenylethanol and by-product acetophenone are taken overhead at 100° C. and 1.5 mm. The bottoms are discarded. The acetophenone rich overhead is hydrogenated in 27 over a copper chromite catalyst at 150 p.s.i.a. hydrogen, 120°, and a LHSV of 0.5 hour$^{-1}$. The effluent comprising 95% alpha phenylethanol is sent back to dehydration zone 18 for conversion to styrene.

The conversion to styrene based on ethylbenzene reacted in zone 1 is 88 mol percent.

The bottoms from column 16 comprising catalyst together with heavy residues (polymers and condensation products) is recycled through lines 19 to 5 to zone 3. A purge stream is removed through line 20 and makeup catalyst is added through line 21.

The olefin oxides from zone 10 are subjected to isomerization and dehydration in zone 22. The catalyst employed is thoria and the conditions are 350° C. and 15 p.s.i.a. at a liquid hourly space velocity of 1 hour$^{-1}$. The product butadiene is readily recovered by distillation at 47° C. and 90 p.s.i.a. from other materials including propylene, unconverted oxides, methyl ethyl ketone, butyraldehyde and residue.

The yield of butadiene based on butenes reacted in zone 3 is 72 mol percent.

Example 2

Referring again to the accompanying drawing, ethylbenzene is oxidized with molecular oxygen in oxidation zone 1. The oxidation is carried out at 140° C. and 25 p.s.i.g. The oxidizing gas is air and the oxidation is continued until 14% of the ethylbenzene is reacted.

The oxidation effluent is passed by means of line 2 to epoxidation zone 3. The oxidation effluent contains by weight 82.3 percent ethylbenzene, 14.0 percent alpha phenylethyl hydroperoxide, 1.5 percent phenylethanol and 2.2 percent other products.

In epoxidation zone 3 a mixture of 60 percent 2-methyl-2-butene and 40% 2-methyl-1-butene is epoxidized at 110° C. and about 50 p.s.i.a. The mol ratio of the hydroperoxide to olefin epoxidized in zone 3 is 1/6. The olefin is included as indicated through line 4.

Epoxidation catalyst comprises molybdenum naphthenate together with sodium naphthenate in an atomic ratio of molybdenum to sodium of 2/1 and is introduced by means of line 5. The amount of molybdenum naphthenate by weight (containing 5% Mo) based on the total mixture is 0.2%.

After a reaction time of 2 hours hydroperoxide conversion is substantially complete. The epoxidation effluent comprising by weight 57.8% ethylbenzene, 26.0% unreacted methylbutenes, 9.3% alpha phenylethanol and 4.6% methylbutene oxides is passed by means of line 6 to distillation zone 7. Unreacted methylbutenes are separated overhead and recycled through lines 8 and 4 back to the epoxidation zone. The overhead distillation temperature is 53 to 61° C. and the pressure is 45 p.s.i.a. The bottoms at 125° C. are passed through line 9 to distillation column 10 and product methylbutene oxides are supported overhead at 70° to 80° C., 15 p.s.i.a. through line 11.

The bottoms faction from zone 10 is passed through line 12 to distillation zone 13 and unreacted ethylbenzene separated overhead at 100° C. and 257 mm. Hg. This ethylbenzene is recycled through line 14 back to oxidation zone 1.

The bottoms from column 13 is passed through line 15 to distillation zone 16. Effluent alpha phenylethanol and by-product acetophenone are removed overhead from column 16 at 100° C. and 1.5 mm. Hg and passed through line 17 to dehydration zone 18. In zone 18 the alpha phenylethanol is dehydrated in the vapor phase at 250° C. and 20 p.s.i.a. by passage of titania catalyst pellets at a liquid hourly space velocity of 0.5 hour$^{-1}$.

The effluent from the dehydration is phase separated in 23 to remove water and distilled in 24 to remove residual water and lights overhead. In the next column 25 product styrene is taken overhead at 70° C. and 60 mm. pressure. The bottoms are sent to a flash distillation where unconverted alpha phenylethanol and by-product acetophenone are taken overhead at 100° C. and 1.5 mm. The bottoms are discarded. The acetophenone rich overhead is hydrogenated in 27 over a copper chromite catalyst at 150 p.s.i.a. hydrogen, 120°, and a LHSV of 0.5 hour$^{-1}$. The effluent comprising 95% alpha phenylethanol is sent back to dehydrogenation zone 18.

The conversion to styrene based on ethylbenzene reacted in zone 1 is 88 mol percent.

The bottoms from column 16 comprising catalyst together with heavy residues is recycled through lines 19 and 5 to zone 3. A purge stream is removed through line 20 and makeup catalyst is added through line 21.

The olefin oxides from zone 10 is subject to isomerization and dehydration in zone 22. The catalyst employed is thoria and the conditions are 350° C. and 15 p.s.i.a. at a liquid hourly space velocity of 1 hour$^{-1}$. The product isoprene is readily recovered by distillation at 34° C. and 15 p.s.i.a., from other materials including butene, unconverted oxides, methyl isopropyl ketone, 2-methylbutyraldehyde and residue.

The yield of isoprene based on methylbutenes reacted in zone 3 is 65 mol percent.

Example 3

Example 1 is repeated using cumene in place of ethyl benzene. Substantially similar conversions to alpha methyl styrene and butadiene are achieved.

Example 4

Example 2 is repeated using cumene in place of ethyl benzene. Substantially similar conversions to alpha methyl styrene and isoprene are achieved.

What is claimed is:
1. A method for the co-production of a styrene and a diolefin which comprises oxidizing ethylbenzene or cumene with molecular oxygen to ethylbenzene hydroperoxide or cumene hydroperoxide, said oxidation being conducted in the liquid phase at a temperature in the range of 40° to 180° C. and at a pressure between 15 p.s.i.a. to 1,000 p.s.i.a. until about 1 to 70% of the ethylbenzene or cumene has been converted epoxidizing an olefin by contact thereof with said hydroperoxide in the liquid phase in the presence of a catalytic amount of a metal selected from the group consisting of titanium, vanadium, selenium, chromium, zirconium, columbium, tantalum, tellurium, uranium, molybdenum, tungsten and rhenium whereby the olefin is converted to an olefin oxide and the hydroperoxide is converted to alpha phenylethanol or alpha, alpha-dimethyl benzyl alcohol, dehydrating said alcohol to a styrene, and isomerizing and dehydrating the olefin oxide to diolefin.

2. A method in accordance with claim 1 wherein the material oxidized to the hydroperoxide is ethylbenzene, the olefin which is epoxidized is a butene and wherein the styrene product is stryrene and the diolefin is butadiene.

3. A method in accordance with claim 1 wherein the material oxidized to the hydroperoxide is ethylbenzene, the olefin which is epoxidized is a methyl butene and wherein the styrene product is styrene and the diolefin product is isoprene.

4. A method in accordance with claim 1 wherein the material oxidized to the hydroperoxide is cumene, the olefin which is epoxidized is a butene, and wherein the styrene product is alpha-methylstyrene and the diolefin product is butadiene.

5. A process in accordance with claim 1 wherein the material oxidized to the hydroperoxide is cumene, the olefin which is epoxidized is a methyl butene and wherein the styrene product is alpha-methylstyrene and the diolefin product is isoprene.

References Cited
UNITED STATES PATENTS

| | | | |
|---|---|---|---|
| 2,802,036 | 8/1957 | Griffin | 260—669 XR |
| 2,929,855 | 3/1960 | O'Connor et al. | 260—669 XR |
| 3,065,246 | 11/1962 | Latourette et al. | 260—348.5 |
| 3,068,291 | 12/1962 | Amir | 260—681 XR |
| 3,293,269 | 12/1966 | Wolgemuth | 260—348.5 |

DELBERT E. GANTZ, *Primary Examiner.*

C. R. DAVIS, *Assistant Examiner.*